April 23, 1968  J. H. BLITZER, JR  3,378,980
LOUVER CONSTRUCTION

Filed Aug. 1, 1966  3 Sheets-Sheet 1

INVENTOR.
JACOB H. BLITZER, JR.
By Bernard Kriegel
ATTORNEY.

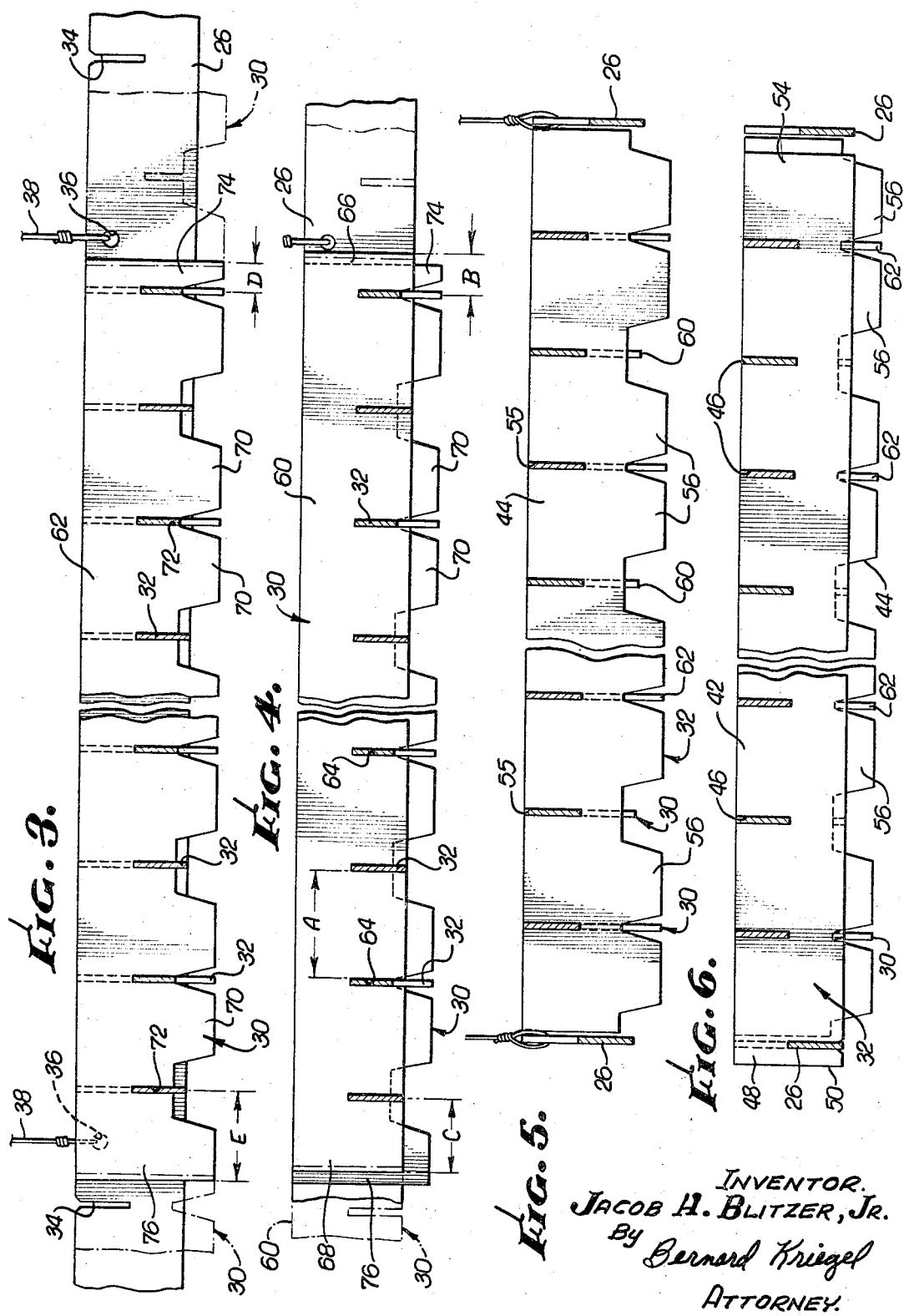

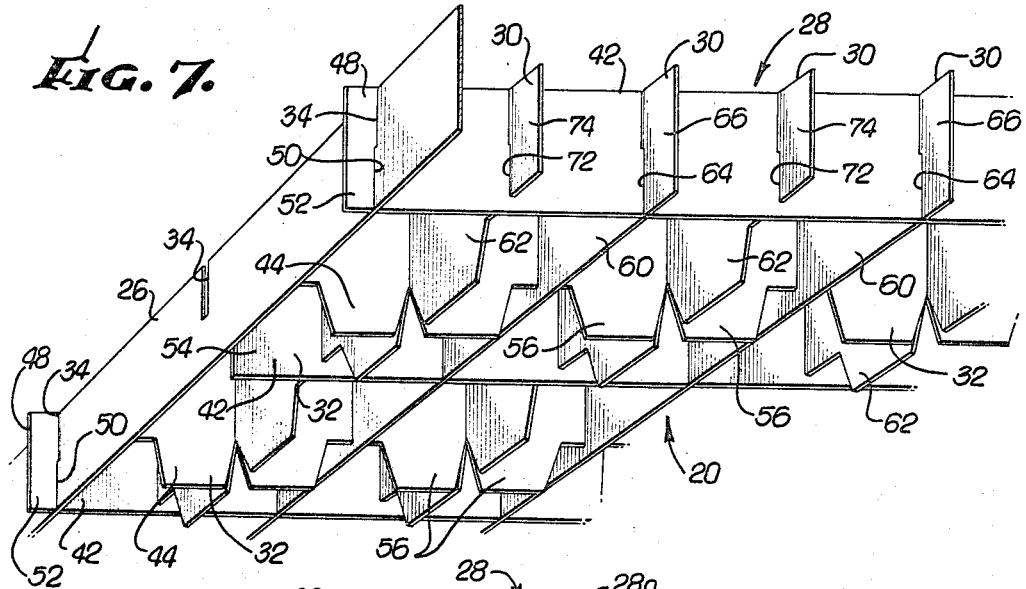
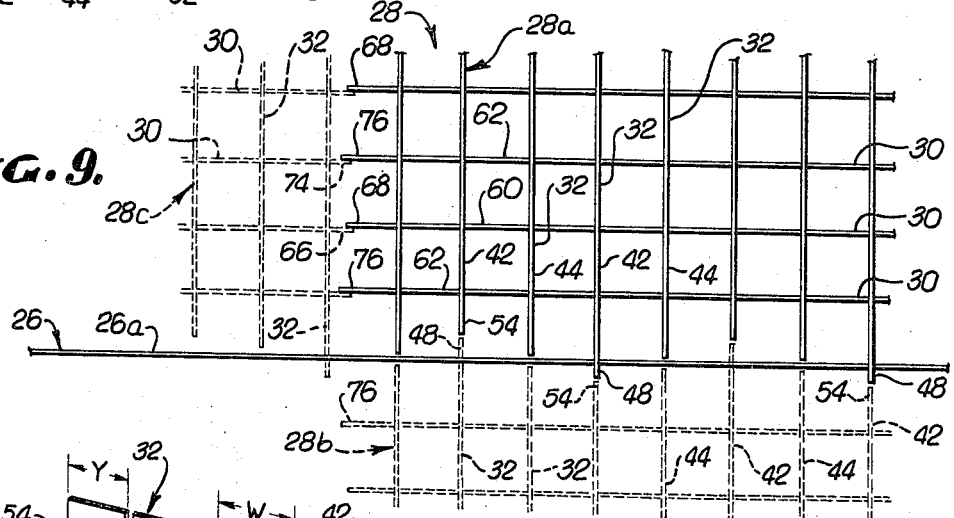
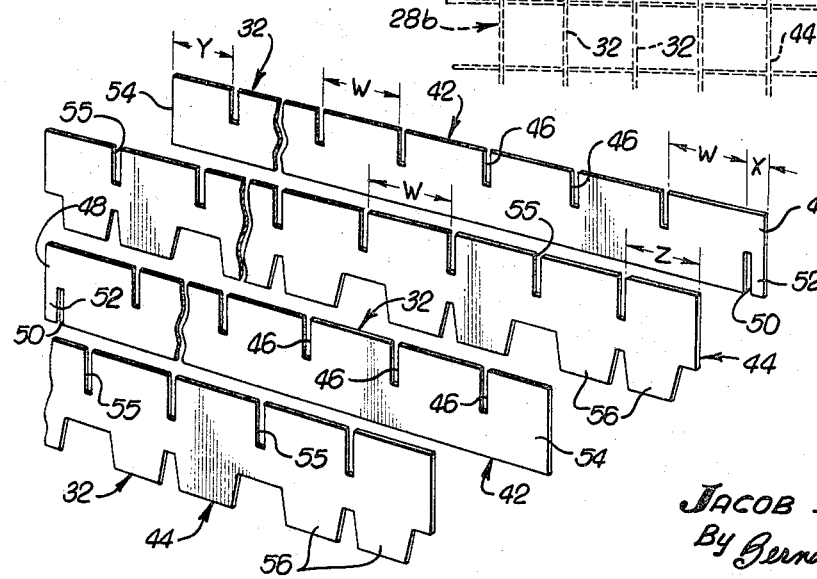

United States Patent Office 3,378,980
Patented Apr. 23, 1968

3,378,980
LOUVER CONSTRUCTION
Jacob H. Blitzer, Jr., Los Angeles, Calif., assignor to Integrated Ceilings, Inc., Los Angeles, Calif., a corporation of California
Filed Aug. 1, 1966, Ser. No. 569,173
6 Claims. (Cl. 52—668)

ABSTRACT OF THE DISCLOSURE

A light diffusing louver for disposition below a light source. Spaced parallel vertical supporting strips are supported below a ceiling and have slots extending downwardly from their upper edges. Baffles are arranged between said strips each comprising longitudinal and transverse ribs, some of the transverse ribs having slots at one side of the baffle extending upwardly from their lower edges and other of the transverse ribs having slots at the opposite side of the baffle extending upwardly from their lower edges. The slotted portions of the transverse ribs are movable downwardly into meshing relation with the slotted portions of the supporting ribs, with the transverse ribs of the baffles on opposite sides of each strip being in substantial alignment. The longitudinal ribs of the baffles between the strips are in substantial alignment.

---

The present invention relates generally to a louver construction, and more particularly to a greatly simplified louver construction comprising parallel support runners and rows of light diffusion panels supported only along their sides between adjacent pairs of the runners for quick and easy installation and subsequent removal of individual diffusion panels.

While high levels of illumination for a lighting area have been achieved with high brightness light sources, such as fluorescent lamps, it has been necessary to control the brightness and glare to provide visual comfort. This has been accomplished with light diffusion means, such as false ceilings provided by louver constructions formed from a plurality of diffusion panels or grids. Each panel may be a cellular or egg crate construction comprising a lattice of cells that may be generally rectangular and open at their upper and lower ends. Light is permitted to pass directly downwardly through the cells; however, when viewed from an angle, the walls or ribs of the panels block direct light so that much of the light observed is deflected or diffused light. The diffusion panels, which, for example, may be square or rectangular units in the nature of 2 feet across, may be supported in edge-to-edge relation to form a louver construction false ceiling that extends across the entire room from wall to wall, or across only a portion of the ceiling area. It is desirable that some, if not all, of the panels be individually removable to afford access to the area above the false ceiling and particularly to the light fixtures. It is also desirable that the meeting or joining lines between adjacent panels be as inconspicuous or unnoticeable as possible to create the illusion of a continuous ceiling.

With these requirements in mind, it is most important to be able to install these panels quickly and easily, without special tools or skills, and with a minimum of support structure. It is also desirable, of course, that the panels be relatively simple and economical to manufacture.

Prior light diffusion panel louver ceiling constructions have not been fully satisfactory in these and other respects. Some prior constructions, while being simple, have been difficult, time consuming, and costly to properly install and/or have not permitted rapid and easy removal of individual panels. Further, light leaks between adjacent panels have often been present, creating distractions and impairing the continuous uniform appearance of the ceiling. Other constructions have been excessively complicated and costly to manufacture and install and/or have not afforded ready removal of individual panels. In particular, support structures for the panels have been complicated and costly, difficult to install and to connect to the panels, and required particular tools and/or skills for the installation. Further, where some degree of continuity has been achieved, there has been little or no provision made for expansion and contraction of the louver construction due to temperature changes.

The present invention contemplates a light diffusion panel louver construction, which is simple and economical to manufacture and install, which provides quick and easy removal of individual panels, and which creates the illusion of a continuous louver ceiling. The construction shown in the drawings comprises spaced parallel support runners which removably support rows of individual light diffusion panels or grids. The panels in each row are supported at their sides only between adjacent pairs of the support runners, there being no direct interconnection between each panel and panels adjacent to it. The panels are so constructed as to themselves provide the interconnecting means with the support runners and also to create the illusion of continuity not only with the adjacent panels in their own row, but with adjacent panels in the rows at either side of them. A minimum of support structure is used, the installation requiring no special tools or skills.

It is an object of the present invention to provide an improved light diffusion panel louver construction.

Another object of the present invention is to provide such a louver construction made up of a plurality of edge-to-edge panels, there being, however, the illusion of continuity between adjacent panels.

Yet another object of the present invention is to provide such a louver construction made up of a plurality of individual panels that requires a minimum of support structure.

It is a further object of the present invention to provide such a multipanel louver construction, in which the support structure comprises an integrated part of the overall pattern of the construction.

Still a further object of the present invention is to provide such a louver construction made up of a plurality of individual panels, with portions of the panels serving as the interconnection between the supports of the louver construction.

An additional object of the present invention is to provide an improved light diffusion panel adapted to form a component of the louver construction above referred to.

Another object of the present invention is to provide a louver construction which may be packaged and shipped in compact form for subsequent assembly and installation.

Still another object of the present invention is to provide a louver construction which is relatively simple and economical to manufacture and install, and which may be installed without special tools or skills.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 2:
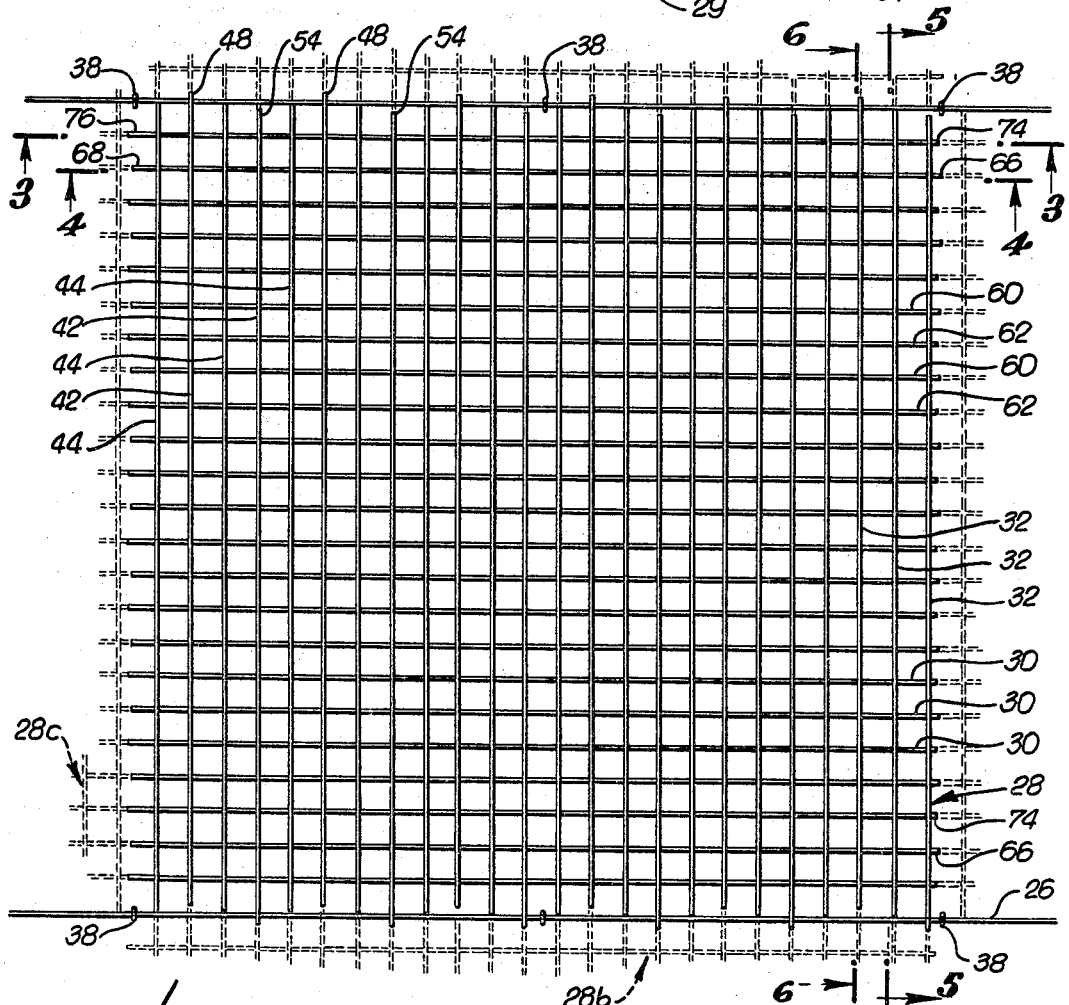
FIG. 2 is a top plan view of an area of the louver ceiling construction taken generally along the line 2—2 on FIG. 1.

FIGS. 3 to 6, inclusive, are enlarged vertical sections taken generally along the respective lines 3—3, 4—4, 5—5, and 6—6 on FIG. 2;

FIG. 7 is a bottom perspective view of a corner portion of one of the light diffusing panels of the louver ceiling construction;

FIG. 8 is a perspective view of portions of the transversely extending ribs of the panels of the louver ceiling construction; and FIG. 9 is an enlarged top plan view of a section of the louver ceiling construction shown in FIG. 2, showing one support runner and a corner portion of a light diffusing panel in solid line, and showing corner portions of adjacent panels in broken lines.

Figure 1:
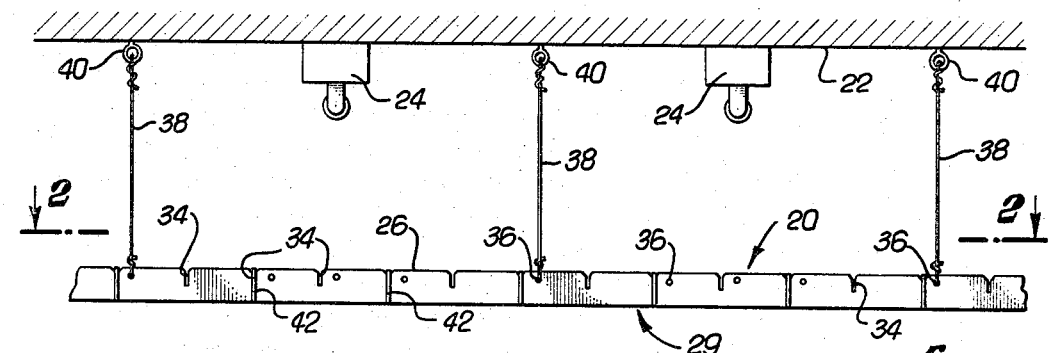
FIGURE 1 is a vertical sectional view of a light diffusion panel louver ceiling construction embodying the present invention, the louver construction being shown suspended from a permanent ceiling and disposed below several fluorescent lighting fixtures mounted on the ceiling.

FIGURE 1 discloses a typical installation of a louver construction 20 as a false ceiling suspended from a permanent ceiling 22 on which are supported several fluorescent lighting fixtures 24.

The louver construction 20 includes, as shown in FIGS. 1 and 2, a plurality of elongate parallel spaced apart horizontally and longitudinally extending support members 26. Rows of horizontal light diffusion panels 28 are supported only at their sides by and between pairs of adjacent support runners 26. There are no connections between the adjacent panels 28 in a row, and there is no direct interconnection between panels 28 in adjacent rows. Each panel 28 is comprised of a series of spaced, parallel longitudinally extending ribs 30 and a series of spaced transversely extending ribs 32, which interengage with one another to form the panel, and which interengage the support runners 26 to support the panel. The ends of the ribs 30, 32 terminate at different points lengthwise and crosswise of a panel to mate with ribs of adjacent panels and with the support runners to provide continuity for the louver construction and to avoid light leak lines between adjacent panels. The support runners 26 are constructed and arranged to combine with the longitudinally extending ribs of the adjacent panels to form a continuous pattern.

FIGS. 1 and 7 illustrate the support runners 26 in detail. Each of the support runners 26 is an elongate horizontally extending vertical strip having a straight-line upper and lower edge and a repeating pattern or series of spaced vertical slots 34 extending downwardly from its upper edge to about its mid-point. Each runner 26 also includes spaced apertures 36 adjacent its upper edge to receive the lower ends of wires 38 supporting the runners, the upper ends of the wires being secured to eyes 40 fixed to the permanent ceiling 22. The vertical slots 34 in the runners receive end portions of the transversely extending ribs 32 of the panels, as will be explained more fully below, to interconnect the panels to, and support the panels from, the runners. The vertical slots 34 in the runners are spaced from each other the same distance as exists between each two alternate transversely extending ribs 32 of the panels.

The support runners 26 may come packaged as a continuous rolled strip, with support runners of desired lengths being cut from the strip as needed for a particular installation. The strip is formed in linear condition and then rolled so that it will return to a linear condition when it is released from the roll to provide generally linear support runners 26. This provides a convenient manner for packaging, shipping and storing the support runners.

A louver construction 20 will normally be made up of a number of diffusion panels 28; however, the panels are all alike so that only one will be described in detail. As noted generally above, each panel 28 includes longitudinally and transversely extending ribs or strips 30, 32.

FIGURE 8 illustrates the individual transversely extending ribs 32, which includes support ribs 42 and intermediate ribs 44. The upper and lower edges of the support ribs are straight and parallel, each support rib 42 having a series of vertical slots 46 extending downwardly from its upper edge to about its mid-point. The slots 46 are spaced at regular intervals designated W (such as about one-inch apart), which defines the distance between the longitudinally extending ribs 30. Each support rib has one interconnecting end 48 provided with a vertical slot 50 extending upwardly from its lower edge to approximately the mid-point of the rib to define a support hook 52. The slot 50 is spaced from the adjacent slot 46 of the support rib by the interval distance W, and the interconnecting end 48 of each support rib extends a short distance, designated X, beyond the associated slot 50. The other or short mating end 54 of each support rib 42 is merely cut off a distance, designated Y, from the last adjacent slot 46 on the support rib, being shorter than the distance W between slots 46 by approximately the distance X.

The intermediate transversely extending ribs 44 each have a series of vertical slots 55 extending downwardly from the upper edge of the rib to approximately its mid-point. The slots 55 are spaced at the same regular intervals W as are the slots in the support ribs 42. The upper edge of each intermediate rib 44 is straight, while its lower edge is provided with pairs of downwardly extending projections 56 spaced at regular intervals along the intermediate rib. Each pair of projections 56 is generally centered below and on opposite sides of alternate slots, other slots 55 between the alternate slots bisecting the distance between adjacent pairs of projections 56. The ends of the intermediate ribs are alike, each being cut off straight and spaced a distance, designated Z, from the adjacent slot 55 of the rib. Distance Z is slightly shorter than distance W between slots by about the thickness of the material of the ribs 30, 32 and runners 26.

As shown in FIGS. 7 and 9, when assembled in a panel 28, the support ribs 42 are alternated with the intermediate ribs 44, and every other support rib 42 is reversed so that every other interconnecting support end 48 is at one side of the panel 28 and the ends 48 of the intervening ribs 42 are at the opposite side of the panel 28.

FIGS. 3, 4 and 7 show the longitudinally extending ribs 30, which include straight-edge ribs 60 and formed ribs 62. Each straight-edge rib 60 has a straight-line upper and lower edges and a series of vertical slots 64 extending upwardly from its lower edge to about its mid-point. The slots 64 are spaced at regular intervals, designated A, along its length, which intervals define the spacing of the transversely extending ribs 32 (FIG. 4). One end 66 of each straight-edge rib 60 terminates a short distance, designated B, from the adjacent vertical slot 64 of the rib, while the other end 68 of the rib terminates a longer distance, designated C, from the adjacent vertical slot 64 of the rib. The sum of the distances B and C is generally equal to or somewhat greater than the distance A.

Each of the longitudinally extending formed ribs 62 has a straight-line upper edge, but has a lower edge formed with pairs of downwardly extending projections 70. The pairs of projections 70 are spaced apart at regular intervals. Each formed rib 62 is also provided with a series of vertical slots 72 extending upwardly from its lower edge to approximately its mid-point, the slots 72 being spaced at the same regular interval A as the slots 64 in the straight-line ribs 60. In each formed rib 62, alternate slots 72 are each located intermediate each pair of projections 70, each intervening slot being located intermediate adjacent pairs of the projections. One end 74 of each formed rib 62 terminates a short distance, designated D, from the adjacent vertical slot 72 of the rib, while the other end 76 of the rib terminates a longer distance, designated E, from the adjacent vertical slot 72 of the rib. The sum of the distances D and E is generally equal to or slightly greater than the distance A.

FIGS. 2, 7 and 9 illustrate the transversely and longitudinally extending ribs 30, 32 interconnected and at right angles to each other. The ribs 30, 32 define generally square openings or cells open at the top and bottom. Each cell may, for example, be about a one-inch cube. The ribs 30, 32 are interengaged or interlocked at each inner section by means of the vertical slots 46, 55, 64, 72, that is, the upwardly opening slots 46, 55 receive the ribs 30, while the downwardly opening slots 64, 72 receive the ribs 32. It will be noted that the interlock serves to restrict both transverse and longitudinal relative movement between the ribs 30, 32. The ribs 30, 32 are constructed of metal and the slots 46, 55, 64, 72 are made very slightly narrower than the thickness of the ribs 30, 32 which they respectively receive so that the ribs are interconnected by a press or interference fit which serves to displace metal and provide a relatively permanent connection between the ribs. Alternately, if desired, the strips may be interconnected permanently as, for example, by means of welding.

In lieu of the slots 46, 55 opening through the upper edges of the ribs 42, 44, they can extend upwardly from their lower edges, in which event the vertical slots 64, 72 would extend downwardly from the upper edges of the ribs 60, 62, instead of from their lower edges as shown in the drawings.

The ribs are arranged and interconnected in a particular pattern or configuration, as shown best in FIGS. 2, 7 and 9, to form a panel 28. The longer ends 68, 76 of the longitudinally extending ribs 60, 62 are positioned at one end of the panel, while the shorter ends 66, 74 of the longitudinally extending ribs 60, 62 are positioned at the opposite end of the panel. As noted above, the longitudinally extending ribs 60, 62 are arranged alternately, that is, a straight-edge rib 60, a formed rib 62, a straight-edge rib 60, etc., so that the longer ends 68, 76 are staggered or alternated with the shorter ends 66, 74. As shown best in FIG. 9, this permits the ends of the longitudinal ribs 30 on one panel to mate with the ends of the longitudinal ribs on the adjacent panel. The ends of the longitudinal ribs 30 may be made to abut or to overlap or overlie to minimize light leak lines produced by gaps or separations between the ends of adjacent ribs.

The transversely extending ribs 32 are also alternated between intermediate ribs 44 and support ribs 42, and, in addition, every other support rib 42 is reversed to alternate the side of the panel 28 on which the interconnection or hook ends 48 of successive support ribs are positioned. For example, the pattern of five ribs at one side of a panel is as follows: support rib with hook 52; intermediate rib 44; support rib reversed with short mating end 54; intermediate rib 44; and support rib with hook 52. The pattern at the other side of the panel for the same five ribs is as follows: support rib with short mating end 54; intermediate rib 44; support rib with hook 52; intermediate rib 44; and support rib with short mating end 54. Thus, there is an interconnecting or hook end 48 every fourth rib on each side of the panel, and there is a short mating end 54 every fourth rib on each side of the panel.

The ribs may be stored, packaged, and shipped in unassembled stacked condition for assembly into panels as needed, either at the plant, the job site, or some other location. The stacked unassembled ribs, together with the rolled strip for providing the runners, may be packaged in quite a small compact package.

For a particular installation, the ribs 30, 32 may be interconnected and thus assembled into the panels 28, and the support runners 26 of the desired length may be cut from the rolled strip. The support runners 26 may then be suspended, as illustrated in FIG. 1, horizontally in spaced parallel relation from one end of the room to the other, the spacing between runners corresponding to the width of a panel, that is, to the centerline distance between a slot 50 on a rib 42 at one side of the panel and the slot 50 on a rib 42 at the opposite side of a panel, the distance measurement being parallel to a rib 42. Each panel 28 is individually installed by tilting it from the horizontal plane to permit its passage between adjacent pairs of support runners 26, or, if necessary, between spaced pairs of panels 28 or between a panel and a room wall. The panel 28 is then lowered so that the interconnection ends 48 of the support strips at either side of the panel interengage with the support runners 26. As shown in the drawings, the ends 48 fit within the vertical slots 34 while the support runners 26 below their slots 34 fit upwardly within the slots 50 of the strips 42. Thus, portions of the panels themselves form the interconnection with the support runners for a minimum of support structure.

As noted above, there is no direct interconnection between adjacent panels, with adjacent ends of ribs merely in abutting, overlapping or close proximity relationship to one another. The support runners 26, in effect, form a common end of adjacent panels 28 so that beginning and end of individual panels are not readily discernible, the louvered construction giving the appearance of continuity across the entire area of the ceiling under which the louvers are supported.

The regular spacing W between longitudinally extending ribs 30 is maintained between each support runner 26 and the longitudinally extending ribs at either side of the support runner. Thus, the support runners 26 comprise longitudinal members in the same regular series spacing as the longitudinal ribs themselves. In this regard, as shown best in FIGS. 2 and 9, each interconnection end 48 of a transversely extending support rib 42 on the panel 28a (shown in solid line) engages and extends beyond an associated support runner 26a, coming in close proximity to the short mating end 54 of the aligned support rib 42 on the panel 28b directly on the other side of the support runner 26a. The interconnection end 48 extends beyond the support runner 26 by the distance X and its aligned short mating end 54 extends the distance Y to the first longitudinally extending rib 30. Each of the short mating ends 54 of the panel 28a similarly extends the distance Y from the last longitudinally extending rib 30 toward the support runner 26a, terminating in close proximity to the interconnection end 48 of the aligned support rib 42 on the panel 28b. The distances X and Y, plus the gap between these ends, comprise the space between the support runner 26 and the next adjacent longitudinally extending rib at either side of the support runner. This space is approximately equal to the regular interval W between longitudinally extending ribs of each panel, so that the regular spacing is carried from one panel through the support runner to the next panel. The ends of the intermediate transversely extending ribs 44 on both panels 28a, 28b are contiguous the support runner 26a at opposite sides thereof, there being virtually no gaps therebetween to prevent light leaks.

The regular spacing A between transversely extending ribs 42, 44 of the panels is also generally provided between the endmost transversely extending ribs on end-to-end adjacent panels 28a, 28c (FIGS. 2 and 9). Thus, the regular series spacing is maintained from panel to panel for the transversely extending ribs 42, 44 also.

The installed louver ceiling construction 29 thus conveys the illusion of continuity in both directions by virtue of the continuous regularly spaced series of longitudinally extending ribs or strips 30 and support runners 26, and the continuous regularly spaced series of transversely extending ribs or strips 32.

Any one of the panels 28 may be readily removed by lifting upwardly from the support runners 26 and tilting it to permit its lowering through the space it occupied between adjacent support runners 26 and adjacent panels.

Thus, a louver construction has been provided which is particularly simple to install without the necessity of special tools or skills, and in which any one of the panels may be quickly and easily removed when desired. At the same time, an illusion of continuity is provided of the entire area of the louver ceiling.

I claim:
1. In a louver construction: elognate, spaced parallel support runners adapted to be supported below a ceiling carrying a light source; light ray baffles extending between and mounted on said support runners; said baffles being coplanar; baffles on opposite sides of a runner being mounted on and carried by said runner, each baffle on one side of said runner having a portion extending across said runner to the other side of said runner and forming a continuation of the baffle on the other side of said runner; said support runners each comprise a vertical strip having vertical slots extending downwardly from its upper edge at spaced intervals along its length, said slots opening through said upper edge; each of said baffles comprising longitudinal and transverse ribs, said transverse ribs including a first group of vertical support ribs that each have a first vertical slot at a first end portion extending upwardly from its lower edge and receiving a first vertical strip at one side of said baffle with said end portion received in a vertical slot of said first vertical strip, said transverse ribs including a second group of vertical support ribs that each have a second vertical slot at a second end portion receiving a second vertical strip at the opposite side of said baffle with said second end portion received in a vertical slot of said second vertical strip; the ends of said first group of ribs opposite their slots terminating short of said second vertical strip, the ends of said second group of ribs opposite their slots terminating short of said first vertical strip to enable baffles on opposite sides of a strip to be mounted thereon with their transverse strips in substantial alignment.

2. In a louver construction as defined in claim 1; wherein said support runners and said longitudinally extending ribs are of generally like vertical dimensions and thickness.

3. In a louver construction as defined in claim 1; wherein the upper edges of said vertical strips and ribs are substantially coplanar.

4. In a louver construction as defined in claim 1; wherein the portions of said support ribs above their vertical slots are received in said vertical slots of said vertical strips and the portions of said vertical strips below their vertical slots are received in said vertical slots of said support ribs.

5. In a louver construction as defined in claim 1; wherein said transversely extendings ribs also include vertical intermediate ribs between said support ribs that each have opposite ends contiguous said first and second vertical strips.

6. In a louver construction as defined in claim 5; wherein said intermediate ribs alternate with said first and second groups of support ribs.

References Cited

UNITED STATES PATENTS 3,050,162   8/1962   Zingone _____ 240—78

FOREIGN PATENTS 834,836   3/1952   Germany.

NORTON ANSHER, *Primary Examiner.*

D. L. JACOBSON, *Assistant Examiner.*